(12) United States Patent  (10) Patent No.: US 11,711,207 B2
Kisley et al.  (45) Date of Patent: Jul. 25, 2023

(54) QUANTUM SAFE KEY EXCHANGE SCHEME

(71) Applicant: INTERNATIONAL BUSINESS MACHINES CORPORATION, Armonk, NY (US)

(72) Inventors: Richard Victor Kisley, Charlotte, NC (US); Michael Miele, Concord, NC (US); Elizabeth Anne Dames, Harrisburg, NC (US); Silvio Dragone, Olten (CH)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 17/216,807

(22) Filed: Mar. 30, 2021

(65) Prior Publication Data
US 2022/0321331 A1    Oct. 6, 2022

(51) Int. Cl.
*H04L 29/06* (2006.01)
*G06F 21/00* (2013.01)
(Continued)

(52) U.S. Cl.
CPC .......... *H04L 9/0841* (2013.01); *H04L 9/0656* (2013.01); *H04L 9/3066* (2013.01)

(58) Field of Classification Search
None
See application file for complete search history.

(56) References Cited

U.S. PATENT DOCUMENTS 10,333,703 B2    6/2019   Arnold et al.
10,498,530 B2   12/2019   Nix
(Continued)

FOREIGN PATENT DOCUMENTS

WO    2016209939 A1   12/2016
WO    2017190223 A1   11/2017
WO    2021044214 A2    3/2021

OTHER PUBLICATIONS

International Search Report and Written Opinion for International Application No. PCT/EP2022/057718; International Filing Date Mar. 20, 2022; dated Jun. 27, 202022; 13 pages.
(Continued)

*Primary Examiner* — Lisa C Lewis
(74) *Attorney, Agent, or Firm* — Cantor Colburn LLP; Edward Wixted

(57) ABSTRACT

Aspects of the invention include a computer-implemented method of executing a hybrid quantum safe key exchange system. The computer-implemented method includes initially retrieving an authenticated random value from a trusted source, generating a first Z value using a first elliptic curve (EC) private key and a first certified form of an EC public key with an EC Diffie-Hellman (ECDH) algorithm, deriving a shared key using the authenticated random value and the first Z value with a key derivation function, decrypting the authenticated random value using a quantum safe algorithm (QSA) private key, generating a second Z value using a second EC private key and a second certified form of the EC public key with the ECDH algorithm and deriving the shared key using the authenticated random value and the second Z value with the key derivation function.

8 Claims, 7 Drawing Sheets

(51) Int. Cl.
　　　*H04L 9/08* 　　(2006.01)
　　　*H04L 9/06* 　　(2006.01)
　　　*H04L 9/30* 　　(2006.01)

(56) References Cited

U.S. PATENT DOCUMENTS

| | | | |
|---|---|---|---|
| 10,621,352 B2 | 4/2020 | Nix | |
| 10,630,467 B1 | 4/2020 | Gilbert et al. | |
| 10,708,046 B1 | 7/2020 | Ashrafi | |
| 10,797,879 B2 | 10/2020 | Liu | |
| 10,958,653 B1* | 3/2021 | Miller | H04L 63/10 |
| 2018/0254894 A1 | 9/2018 | Arnold et al. | |
| 2019/0245681 A1* | 8/2019 | Alwen | H04L 9/085 |
| 2020/0280436 A1* | 9/2020 | Nix | H04L 9/0618 |
| 2023/0012013 A1* | 1/2023 | Livshin | G06F 21/78 |

OTHER PUBLICATIONS

International Search Report; International Application No. TW 111103284; International Filing Date: Jan. 26, 2022; dated Dec. 16, 2022; 10 pages.

Anonymous "Asymmetric Symmetric-Encryption Double RC4"—An Very Low Complexity & Secure Authentication Algorithm, IP.com No. IPCOM000154900D; Original Publication Date: Jul. 17, 2007; 4 pgs.

Anonymous "Sharing Confidential Data Between Application Users in a Combined (symmetric/asymmetric) encryption scheme", IP.com No. IPCOM000228586D; IP.com Publication Date: Jun. 20, 2013; 6 pgs.

Gooch, Robert P., et al. "Quantum Safe Key Distribution System", IP.com No. IPCOM000245174D; IP.com Publication Date: Feb. 16, 2016; 12 pgs.

Kaplan, M., et al. "Breaking Symmetric Cryptosystems using Quantum Period Finding", retrieved at: https://obj.uimiacs.umd.edu/extended_abstracts/QCrypt_2016_paper_38.pdf; Paper 38; 2016; 3 pgs.

Murthy, S.G.K., et al. "Secure Key Distribution using Quantum Cryptography", Global Journal of Computer Science and Technology Cloud & Distributed; vol. 12, Issue 12, V. 1.0; 2012; Online ISSN: 0975-4172 & Print ISSN: 0975-4350; 5 pgs.

Xu, Jia et al. "Practical Quantum-Safe Stateful Hybrid Key Exchange Protocol", retrieved at: https://eprint.iacr.org/2020/763.pdf; Mar. 2020; 17 pgs.

* cited by examiner

QUANTUM SAFE KEY EXCHANGE SCHEME

BACKGROUND

The embodiments described herein relate in general to the field of encryption. More specifically, the embodiments described herein relate to a key exchange process.

Various methods exist in support of electronic data security. Cryptography is the transformation of intelligible information into an apparently unintelligible form in order to conceal the information from unauthorized parties. Cryptography is used for various purposes, such as to protect information transmitted through communications networks or stored on data storage units. Cryptographic procedures can be used not only to protect the privacy of data but also the integrity of data. A hardware security module (HSM) is a device with a secure boundary that meets one or more of a variety of different security standards for intrusion detection and maintenance of secure data. Common cryptographic architecture (CCA) is a programming interface to the HSM and is noted for achieving secure processing of transactions using secret keys and for the management of secret keys.

The cryptographic transformation of data is ordinarily defined by a selected algorithm, or procedure, under the control of a key. Since the algorithm is normally public knowledge, protection of the transformed, or enciphered, data depends on the secrecy of the key.

SUMMARY

Embodiments of the present invention are directed to a computer-implemented method of executing a hybrid quantum safe key exchange system. The computer-implemented method includes retrieving an authenticated random value from a trusted source, generating a first Z value using a first elliptic curve (EC) private key and a first certified form of an EC public key with an EC Diffie-Hellman (ECDH) algorithm, deriving a shared key using the authenticated random value and the first Z value with a key derivation function, decrypting the authenticated random value using a quantum safe algorithm (QSA) private key, generating a second Z value using a second EC private key and a second certified form of the EC public key with the ECDH algorithm and deriving the shared key using the authenticated random value and the second Z value with the key derivation function.

In accordance with one or more embodiments of the present invention, the retrieving of the authenticated random value from the trusted source, the generating of the first Z value and the deriving of the shared key using the authenticated random value and the first Z value are executed separately from the decrypting of the authenticated random value, the generating of the second Z value and the deriving of the shared key using the authenticated random value and the second Z value.

In accordance with one or more embodiments of the present invention, the computer-implemented method further includes encrypting the authenticated random value using a cipher key and a QSA public key. The encrypting incudes a call of a first common cryptographic architecture (CCA) programming interface and each instance of the deriving of the shared key comprises a call of a second CCA programming interface. Prior to the decrypting of the authenticated random value, the authenticated random value is wrapped with the QSA public key.

In accordance with one or more embodiments of the present invention, the key derivation function includes a hashing of at least the authenticated random value and the first Z value and a hashing of at least the authenticated random value and the second Z value.

In accordance with one or more embodiments of the present invention, the key derivation function includes a hashing of at least the authenticated random value concatenated with the first Z value at the second computer and a hashing of at least the authenticated random value concatenated with the second Z value at the first computer.

Embodiments of the present invention are directed to a computer program product for executing a hybrid quantum safe key exchange system. A non-limiting example of the computer program product includes a processing system and a non-transitory computer-readable medium having program instructions embodied therewith. The program instructions are readable by the processing system to cause the processing system to execute a method including retrieving an authenticated random value from a trusted source, generating a first Z value using a first elliptic curve (EC) private key and a first certified form of an EC public key with an EC Diffie-Hellman (ECDH) algorithm, deriving a shared key using the authenticated random value and the first Z value with a key derivation function, decrypting the authenticated random value using a quantum safe algorithm (QSA) private key, generating a second Z value using a second EC private key and a second certified form of the EC public key with the ECDH algorithm and deriving the shared key using the authenticated random value and the second Z value with the key derivation function.

In accordance with one or more embodiments of the present invention, the retrieving of the authenticated random value from the trusted source, the generating of the first Z value and the deriving of the shared key using the authenticated random value and the first Z value are executed separately from the decrypting of the authenticated random value, the generating of the second Z value and the deriving of the shared key using the authenticated random value and the second Z value.

In accordance with one or more embodiments of the present invention, the method further includes encrypting the authenticated random value using a cipher key and a QSA public key. The encrypting incudes a call of a first common cryptographic architecture (CCA) programming interface and each instance of the deriving of the shared key comprises a call of a second CCA programming interface. Prior to the decrypting of the authenticated random value, the authenticated random value is wrapped with the QSA public key.

In accordance with one or more embodiments of the present invention, the key derivation function includes a hashing of at least the authenticated random value and the first Z value and a hashing of at least the authenticated random value and the second Z value.

In accordance with one or more embodiments of the present invention, the key derivation function includes a hashing of at least the authenticated random value concatenated with the first Z value at the second computer and a hashing of at least the authenticated random value concatenated with the second Z value at the first computer.

Embodiments of the present invention are directed to a method of executing a hybrid quantum safe key exchange system. A non-limiting example of the method includes retrieving an authenticated random value from a trusted source, generating a first Z value using a first elliptic curve (EC) private key and a first certified form of an EC public key with an EC Diffie-Hellman (ECDH) algorithm, deriving a shared key using the authenticated random value and the first Z value with a key derivation function, decrypting the authenticated random value using a quantum safe algorithm (QSA) private key, generating a second Z value using a second EC private key and a second certified form of the EC public key with the ECDH algorithm and deriving the shared key using the authenticated random value and the second Z value with the key derivation function.

In accordance with one or more embodiments of the present invention, the retrieving of the authenticated random value from the trusted source, the generating of the first Z value and the deriving of the shared key using the authenticated random value and the first Z value are executed separately from the decrypting of the authenticated random value, the generating of the second Z value and the deriving of the shared key using the authenticated random value and the second Z value.

In accordance with one or more embodiments of the present invention, the method further includes encrypting the authenticated random value using a cipher key and a QSA public key. The encrypting incudes a call of a first common cryptographic architecture (CCA) programming interface and each instance of the deriving of the shared key comprises a call of a second CCA programming interface. Prior to the decrypting of the authenticated random value, the authenticated random value is wrapped with the QSA public key.

In accordance with one or more embodiments of the present invention, the key derivation function includes a hashing of at least the authenticated random value and the first Z value and a hashing of at least the authenticated random value and the second Z value.

In accordance with one or more embodiments of the present invention, the key derivation function includes a hashing of at least the authenticated random value concatenated with the first Z value at the second computer and a hashing of at least the authenticated random value concatenated with the second Z value at the first computer.

Embodiments of the present invention are directed to a computer-implemented method of executing a hybrid quantum safe key exchange system using common cryptographic architecture (CCA) programming interfaces. A non-limiting example of the computer-implemented method includes initially decrypting a random value using a predefined key, generating a first Z value using a first elliptic curve (EC) private key and a first certified form of an EC public key with an EC Diffie-Hellman (ECDH) algorithm, deriving a shared key using the random value and the first Z value with a key derivation function, secondarily decrypting the random value using a quantum safe algorithm (QSA) private key, generating a second Z value using a second EC private key and a second certified form of the EC public key with the ECDH algorithm and deriving the shared key using the random value and the second Z value with the key derivation function.

In accordance with one or more embodiments of the present invention, completion of the derivation of the shared key includes a selection from the group consisting of hashing an output of a Diffie Hellman operation on a public key and a private key, the random value, a counter value and input data and hashing a concatenation of an output of a Diffie Hellman operation on a public key and a private key, the random value, a counter value and input data.

Embodiments of the present invention are directed to a computer-implemented method of executing a hybrid quantum safe key exchange system using common cryptographic architecture (CCA) programming interfaces. A non-limiting example of the computer-implemented method includes initially decrypting a random value using a cipher key, generating a first Z value using a first elliptic curve (EC) private key and a first certified form of an EC public key with an EC Diffie-Hellman (ECDH) algorithm, deriving a shared key using the random value and the first Z value with a key derivation function, secondarily decrypting the random value using a quantum safe algorithm (QSA) private key, generating a second Z value using a second EC private key and a second certified form of the EC public key with the ECDH algorithm and deriving the shared key using the random value and the second Z value with the key derivation function.

In accordance with one or more embodiments of the present invention, completion of the derivation of the shared key includes a selection from the group consisting of hashing an output of a Diffie Hellman operation on a public key and a private key, the random value, a counter value and input data and hashing a concatenation of an output of a Diffie Hellman operation on a public key and a private key, the random value, a counter value and input data.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
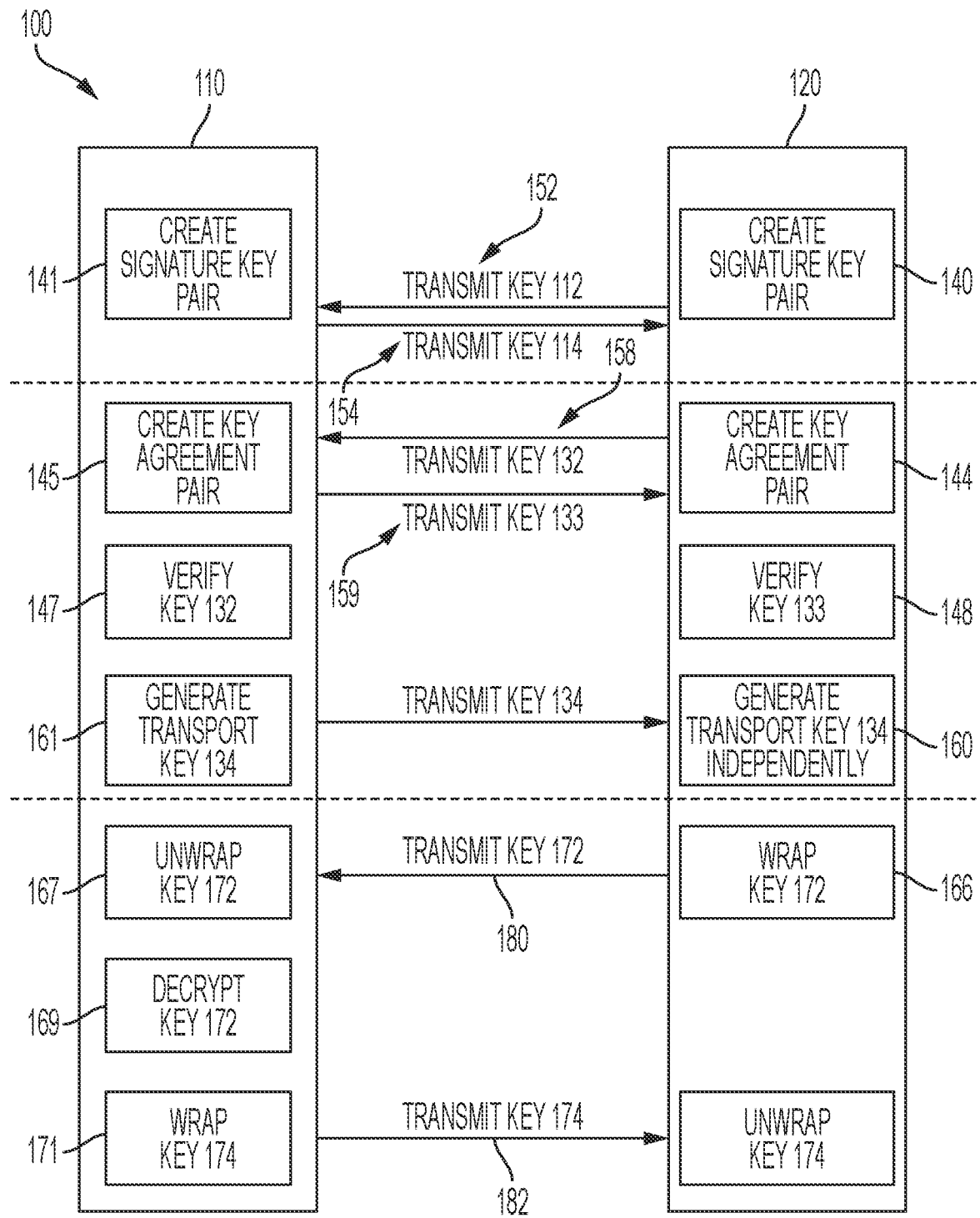
FIG. 1 depicts an overview of the operation of one or more exemplary embodiments.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a method, using a common cryptographic architecture (CCA) programming interfaces CSNDPKE and CSND-EDH, to negotiate a shared symmetric cryptographic key using two asymmetric key pairs: a quantum safe algorithm (QSA) key pair for key encryption mechanism (KEM) purposes and an elliptic curve cryptography (ECC) key pair. An advantage of the method is that, with a minimum number of steps, users of the CCA programming interface may implement a hybrid key exchange system that involves a strong QSA key pair and a current ECC key pair. Another advantage of the method is that ECC is a well-known and standards-compliant algorithm that is approved for use in many regulated crypto-systems. In addition, the QSA KEM that is used adds 'future proof' protection against quantum attacks. Here, if a data stream is stored where only ECC keys are used to negotiate the symmetric key, and ECC is cracked by quantum computers, the symmetric key may be generated by the attackers. The hybrid-generated symmetric key is not subject to this attack.

Cryptography is the transformation of intelligible information into an apparently unintelligible form in order to conceal the information from unauthorized parties. A common form of cryptography is public-key cryptography, also known as asymmetric cryptography. Public-key cryptography uses a pair of keys, a public key, and a private key. Exemplary forms of public-key cryptography include RSA cryptography and elliptic curve cryptography (EC or ECC).

In common usage, a first user (Alice) has both a public key, that is publicly known and available and a related private key, which is known only to Alice and was created at the same time as the public key. If a second user (Bob), wishes to send a secure message to Alice, he encrypts the message using Alice's public key. The message is encrypted and only can be decrypted by Alice or someone who has Alice's private key. Asymmetric cryptography solves certain problems of symmetric cryptography, such as the fact that a symmetric key has to be in the possession of both the sender and receiver in order to work properly. The problem with that situation is that the symmetric key must be distributed to both Alice and Bob in order to maintain security.

A public/private key pair also can be used to sign messages, in order to prove that the message actually was sent by the sender. In such a case, Alice would sign a message using her private key. Anyone who receives the message can use Alice's public key to verify her signature to confirm it was sent by Alice.

Cryptography is of such importance that there has been a growth in the use of hardware security modules (HSM), physical computing devices that safeguard and manage digital keys for authentication purposes. An HSM also provides processing for cryptography functions. Some HSM operate using common cryptographic architecture (CCA), an application programming interface (API) that allows one to obtain services from, and to manage the operation of, a cryptographic system that meets CCA specifications. An HSM can be embodied as a card that inserts into a computer system. In some embodiments, an HSM can be inserted into a Peripheral Component Interconnect Express (PCI Express or PCIe) bus of a computer system.

In a system such as an HSM, there can be a desire to move keys from one system to another. For example, one might desire to retrieve a key that is stored in the HSM and move it to a mainframe computer to which the HSM is coupled. In some embodiments, a mainframe computer can store keys for use by the HSM because the HSM needs additional storage. In many current implementations, keys are stored in an encrypted form in the HSM. Some entities request that a key is sent in encrypted form, even if the medium through which the key will be sent (e.g., an internal PCIe bus in which the HSM is inserted) cannot be accessed externally. Thus, in order for the mainframe computer to use a key, it must first have the key decrypted by the HSM.

In some embodiments, before a first key is transmitted from an HSM to another module, a second key is used to wrap the first key. The second key can be an ephemeral wrapping key. The ephemeral wrapping key can be generated using a method that allows two parties to exchange a key that is known to both parties but is never transmitted. The ephemeral key can be generated using an algorithm such as the Elliptic Curve Diffie Hellman (ECDH) algorithm. An ECDH algorithm uses a shared secret to generate a key that is known to both parties but is never exchanged. The operation of an ECDH algorithm will be described in further detail below.

With reference to FIG. 1, a sequence diagram illustrating a system 100 is shown. System 100 presents an overview of the operation of an embodiment. In system 100, block 110 represents the HSM. Block 120 represents an external system to which HSM 110 is sending information. In some embodiments, HSM 110 can be embodied as an expansion card and external system 120 can include an interface where HSM 110 can be inserted. In some embodiments, external system 120 is a computer (such as a desktop computer, laptop computer, tablet, server, or mainframe) with expansion slots. In some embodiments, system 100 includes multiple computing elements (including HSM 110 and external system 120) within the same housing. In such embodiments, external system 120 and HSM 110 can be referred to as the first element and the second element, respectively. It should be understood that the order the elements does not matter, so which computing element is the first element and which is the second element can vary in different embodiments.

Among the duties fulfilled by HSM 110 is storing and/or managing cryptographic keys. For security purposes, the cryptographic keys are typically encrypted before they are stored. As explained above, when external system 120 requests a particular cryptographic key 104, a traditional embodiment would involve HSM 110 decrypting the requested cryptographic key and transmitting the decrypted key to external system 120, because the connection between HSM 110 and external system 120 is typically internal and secure. To ensure even greater security, it can be desirable to ensure that keys that are transmitted between HSM 110 and external system 120 are first encrypted such that the transmission between HSM 110 and external system 120 cannot be used if it is "sniffed" or otherwise hijacked.

There is an initial system setup (termed "Setup-S"). External system 120 creates a signature key pair (block 140). This pair can be called ext-sign-pry (the external system private signature generation key) and ext-sign-pub (the external public signature verification key). Ext-sign-pry stays private within external system 120. Ext-sign-pub is represented by key 112 and is transmitted to HSM 110 (arrow 152). Key 112 is sent within a predefined data structure called a self-signed public key data object and is verified by HSM 110. Thereafter, HSM 110 will be able to verify signatures that were created by external system 120.

HSM 110 generates its own signature verification key pair (block 141). The public signature verification key can be called card-sign-pub, represented as key 114. The private portion of this key pair (the private signature generation key, or card-sign-prv) remains in HSM 110. Key 114 is transmitted from HSM 110 to external system 120 (arrow 154). Key 114 is sent within a predefined data structure a self-signed public key data object and is verified by external system 120. Thereafter, external system 120 will be able to verify signatures that were created by HSM 110.

Thereafter follows the setup of the HSM domain (termed "Setup-D"). External system 120 creates a domain-level key agreement pair (block 144): ext-ka-pry and ext-ka-pub (illustrated as key 132). Key 132 is signed by ext-sign-prv. External system 120 then sends ext-ka-pub (key 132) to HSM 110 (arrow 158). HSM 110 verifies key 132 by using key 112 (block 147).

HSM 110 creates a domain-level key agreement pair (block 145): card-ka-pry and card-ka-pub (illustrated as key 133). Key 133 is signed by card-sign-pry. HSM 110 then sends card-ka-pub to external system 120 (arrow 159). External system 120 verifies key 133 by using key 114 (block 148).

HSM 110 then generates a transport key (key 134) at block 161. Transport key 134 is based on key 132 and the private key portion of key 133. In some embodiments, transport key 134 is generated using a Diffie-Hellman process, presented in further detail below. In addition, a first key check value is created based on transport key 134. Key check values can be created in one of a variety of different manners. In some embodiments, a key check value can be calculated by performing an NIST SP 800-38B block Cipher-based Message Authentication Code (CMAC) algorithm on a 16 byte data block filled with bytes values to 0x00.

Transport key 134 is wrapped by a random key that never leaves HSM 110. The random key is known as the CWK (check wrapping key). A key check value is created based on transport key 134. The wrapped transport key 134 is combined with the key check value into an encrypted blob. The encrypted blob is sent along with public key 114 from HSM 110 to external system 120.

External system 120 generates transport key 134 using public key 133 and the private portion of key 132. Thus, external system 120 is able to derive transport key 134 without transport key 134 ever being transmitted between HSM 110 and external system 120. To verify that transport key 134 as derived by external system 120 is the same as transport key 134 as generated by HSM 110, external system 120 generates a second key check value and compares the second key check value with the first key check value generated by HSM 110 and sent in the blob. Setup-D phase is now complete.

Thereafter follows the operational or run-time or translation phase. During operation, external system 120 sometimes needs an operational key 172 to be decrypted by HSM 110. As stated above, HSM 110 has the ability to unlock all keys used by external system 120.

Operational key 172 is stored in system 120 in a wrapped format. Encrypted operational key 172 is transmitted by external system 120 to HSM 110, along with encrypted blob at arrow 180.

HSM 110 unwraps operational key 172 (block 167) and decrypts it to a key 174 that is usable by external system 120 (block 169). HSM 110 wraps key 174 using transport key 134 (block 171) and transmits the wrapped key to external system 120 (arrow 182). Because external system 120 has the ability to decrypt items that are wrapped by transport key 134, external system 120 is able to access and use key 174 by unwrapping key 174 in block 168.

Figure 2:
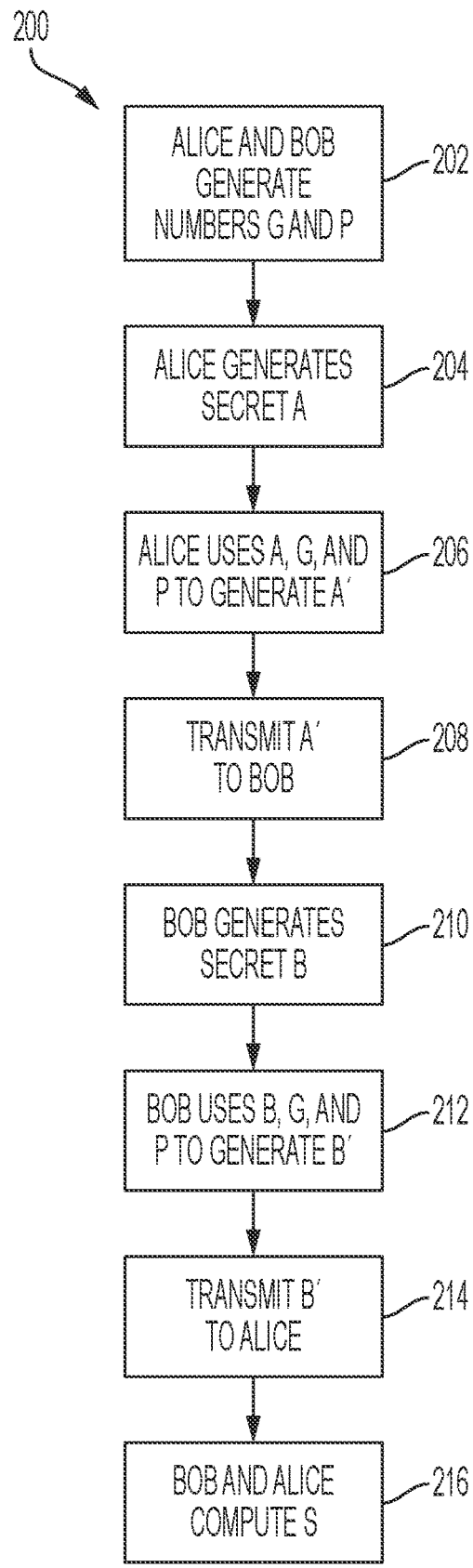
FIG. 2 depicts an overview of the operation of one or more exemplary embodiments.

Some of the processes discussed above reference the Elliptic Curve Diffie Hellman (ECDH) algorithm. With reference to FIG. 2, a flowchart illustrating the operation of an exemplary ECDH algorithm is set forth. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped.

Method 200 depicts the operation of an ECDH algorithm that can be used in the operation depicted in FIG. 1. It should be understood that other key exchange algorithms can be used in place of ECDH. In method 200, two parties, Alice and Bob, are attempting to jointly create a key. If a secure channel was present, Alice and Bob could merely use the secure channel to transmit the key between each other. However, in the embodiment shown in method 200, a secure channel is not present. So, Alice and Bob are attempting to create a key while passing information to each other via a public channel that can be snooped by a third party (e.g., Eve).

At block 202, both Alice and Bob agree on two different prime numbers g and p. The numbers g and p are openly communicated between Alice and Bob. Alice generates a secret number a at block 204. Secret number a is never transmitted between Alice and Bob. Indeed, Bob will never know the value of a. Alice then uses g, p and a to make a computation to find a': a'=$g\hat{\ }a$ mod p (block 206). Alice transmits a' to Bob (block 208).

At block 210, Bob generates a secret number b. Secret number b is never transmitted between Alice and Bob. Indeed, Alice will never know the value of b. Bob then uses g, p and b to make a computation to find b': b'=$g\hat{\ }b$ mod p (block 212). Bob transmits b' to Alice (block 214).

Bob then computes a'^b mod p and Alice computes b'^a mod p (block 216). Because of an interesting property of the modulus operation, a'^b mod p and b'^a mod p have the same value, S. In addition, the modulus operation is extremely difficult to reverse. In other words, a third party (Eve) could intercept all communications between Alice and Bob and still not be able to recreate the value S. The value S is a secret value that both Alice and Bob independently generated without the need to transmit data over a secure connection. Thus, the value S can be used as a cryptographic key for further communications between Alice and Bob.

Quantum computing will have a drastic impact on the protocols and methods described above. Eventually public key algorithms, such as RSA and ECC, will be rendered worthless and implementers of multi-party protocols that protect exchanged data of any value will have to consider approaches that incorporate public key algorithms that are resistant to quantum attacks. At the same time, the current quantum safe algorithms are generally not yet fully tested, so a new protocol must be developed to allow for combinations of multiple public key algorithms to secure a data stream. Such development will need to take into account the fact that an important part of setup processes for secure data exchanges is the negotiation of a symmetric encryption key using asymmetric algorithms. Currently, this is usually done with either RSA-Diffie Hellman or elliptic curve Diffie Hellman algorithms or other similar protocol. In these and other cases, when two parties want to exchange keys, each party has a public/private asymmetric key pair. The parties exchange public keys and then each party uses their private key and the other party's public key with a given algorithm to create a shared symmetric key.

A problem is that quantum safe algorithms (QSA) are not typically usable with a Diffie-Hellman variant. Thus, one or more embodiments of the present invention provide for the use of CCA programming interfaces CSNDPKE and CSND-EDH to negotiate a shared symmetric cryptographic key using two asymmetric key pairs: a QSA key pair for KEM purposes and an elliptic curve cryptography (ECC) key pair.

Figure 3:
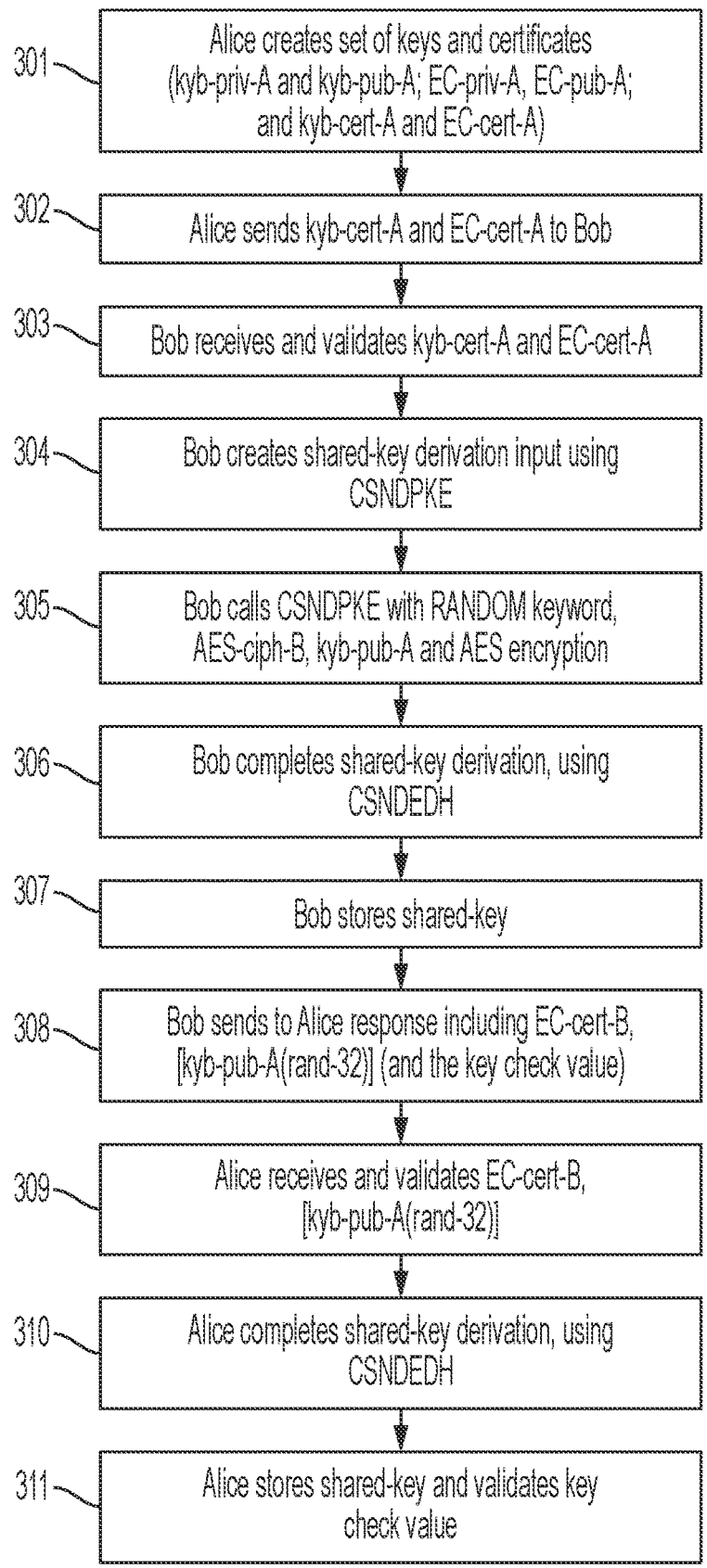
FIG. 3 is a flow diagram illustrating a hybrid quantum safe algorithm (QSA) scheme in accordance with embodiments of the present invention.

With reference to FIG. 3 and in accordance with one or more embodiments of the present invention, a hybrid QSA key exchange scheme is provided and involves two participants: Alice and Bob. The scheme involves two CCA application programming interfaces (APIs): CSNDPKE and CSNDEDH.

In a first operation, Alice creates a set of keys and certificates (301). These include, for example, kyb-priv-A and kyb-pub-A; EC-priv-A, EC-pub-A; and kyb-cert-A and EC-cert-A. The kyb-priv-A and kyb-pub-A are a key pair for a certain quantum safe algorithm that serves as a key encapsulation mechanism. The EC-priv-A and EC-pub-A are an elliptic curve cryptography (ECC) key pair for key agreement. The kyb-cert-A and the EC-cert-A are authenticated forms of the kyb-pub-A and the EC-pub-A keys. In a second operation, Alice sends kyb-cert-A and EC-cert-A to Bob (302).

Bob receives and validates kyb-cert-A and EC-cert-A (303) and thus he trusts the items received from Alice. At this point, Bob creates a set of keys, certificates and tokens. These include, for example, AES-ciph-B; EC-priv-B and EC-pub-B; EC-cert-B; and kyb-pub-A. The AES-ciph-B is an AES-cipher key in a CCA key token and should be as strong as a derived shared-key and should allow for encryption and decryption since it is used on a same node. The EC-priv-B and the EC-pub-B form an ECC key pair for key agreement. The EC-cert-B is an authenticated form of the EC-pub-B and the kyb-pub-A is a CCA public key token with a public key pulled from the kyb-cert-A that Bob received from Alice. Bob then creates a shared-key derivation input using CSNDPKE (304) and calls CSNDPKE with a RANDOM keyword, the AES-ciph-B, the kyb-pub-A and an AES IV encryption (305). In doing so, Bob calls the API with a program and the corresponding code will generate a random value and then encrypt the random value with the AES-ciph-B and the kyb-pub-A key. The call to CSNDPKE generates a random 32 byte value (rand-32), AES-CBC encrypts the random 32 byte value using the AES-ciph-B and AES IV encryption, then encrypts the random 32 byte value with kyb-pub-A and QSA Kyber encryption. Both encrypted versions of the random 32 byte value are returned, with [Kyb-pub-A(rand-32)] in the PKA_enciphered_key-value parameter. Next, Bob completes the shared-key derivation, using CSNDEDH (306). Here, Bob calls CSNDEDH with a derivation keyword (optional), a desired key length (a desired key length of the key), the encrypted random number, AES-ciph-B, AES encryption IV, EC-priv-B, EC-cert-A (this is Alice's public key) and an output skeleton token. CSNDEDH decrypts rand-32 using the key AES-ciph-B and the AES IV encryption, uses EC-priv-B and EC-cert-A with ECDH to generate the Z value and passes the Z value and rand-32 to the key derivation function indicated by the derivation keyword.

There are multiple ways to derive the shared key ($K_S$) of length $L_S$, the most common way is to use a hash function (H) of sufficient strength over a concatenation of the input values.

The generic formula then is $K_S$=select $L_S$ bytes (H($F_A$(Z, rand-32, counter, salt))), where $K_S$: derived shared key, $L_S$: length in bytes of $K_S$, H: hash function, $F_A$: is a function that arranges the derivation inputs according to a pattern agreed to by Alice and Bob with the most common method being to concatenate the inputs together into one binary string of bytes, Z: is output from ECC Diffie Hellman operation on a public key/private key and is a secret value since it is derived from the private key, rand-32: is a random value passed into the derivation function that is 32 bytes long, counter: is, if the needed key length is longer than the block length provided by H, then multiple rounds of H are needed where the counter starts with a known value and increments for each round of H, and salt: is 'other' user input data to the derivation function that may be used to further differentiate the keys derived and the length of the salt is agreed to by Alice and Bob.

Alternatively, the shared-key ($K_S$) of the requested length can be derived as shown here, with a specific form of the generic formula shown above. In this case, the specific formula implemented is $K_S$=select $L_S$ bytes (H(Z||rand-32||counter||salt)) where $K_S$: is a derived shared key, $L_S$: is a length in bytes of $K_S$, H: is a hash function, || is a bit-wise concatenation operation, Z: is an output from an ECC Diffie Hellman operation on a public key/private key and has a secret value since it is derived from the private key, rand-32: is a random value passed into the derivation function that is 32 bytes long, counter: is four bytes, big-endian, starting value is 0x00000001 and, if the needed key length is longer than the block length provided by H, then multiple rounds of H are needed, and the counter starts with a known value and increments for each round of H, salt: is length=0 and typically no salt is used while 'other' user input data to the derivation function may be used to further differentiate the keys derived with the length of the salt being agreed to by Alice and Bob. This places the shared-key in the output skeleton token provided, encrypts the key value and returns the final CCA shared-key token.

At this point, Bob stores the shared-key (307) and sends to Alice the response (308), which includes EC-cert-B, [kyb-pub-A(rand-32)] (and the key check value).

Alice then receives and validates EC-cert-B, [kyb-pub-A (rand-32)] (309), completes the shared-key derivation, using CSNDEDH (310) and stores the shared-key and validates the key check value (311). Alice calls CSNDEDH with a derivation keyword, desired key length, [kyb-pub-A (rand-32)], kyb-priv-A, EC-priv-A, EC-cert-B and output skeleton token. CSNDEDH decrypts rand-32 using kyb-priv-A, uses EC-priv-A and EC-cert-B with ECDH to generate the Z value and passes the Z value and the rand-32 to the key derivation function indicated by the derivation keyword, places the shared-key in the output skeleton token provided, encrypts the key value and returns the final CCA shared-key token. The shared-key of the requested length is derived using the same formula as Bob. The shared-key is now established for both Alice and Bob.

In accordance with one or more embodiments of the present invention, the role of the CSNDPKE in the method described above is to create the rand-32 derivation input and return rand-32 in two forms: (1) the form in which it is encrypted by Bob's AES cipher key, AES-ciph-B and (2) the form in which it is encrypted by Alice's public key, kyb-pub-A. This is accomplished in one call to CSNDPKE as follows:

inputs:
    RANDOM rule-array keyword,
    AES-ciph-B: AES-cipher key for Bob
        NOTE: AES-ciph-B should be as strong as the derived shared-key
    Kyb-pub-A as PKA_key_identifier: CRYSTALS-Kyber key for Alice
    Optional AES IV encryption
outputs:
    keyvalue parameter: [AES-ciph-B(rand-32)]
    PKA_enciphered_keyvalue parameter: [Kyb-pub-A(rand-32)]

In accordance with one or more embodiments of the present invention, the role of CSNDEDH in the method described above is to complete the shared-key derivation for Alice or Bob and return the shared-key in a CCA key token.

Change to Key derivation in the CSNDEDH service:
    For DERIV01 and DERIV02 the change is the same:
        NIST SP 800-56C Rev 2 has defined $Z' = Z \| T$, where T is a hybrid addition.
        The decrypted hybrid_ciphertext is concatenated to the end of the normal Z in the CSNDEDH concatenation string.

This is accomplished in one call to CSNDEDH as follows:

Bob's call to CSNDEDH
    inputs:
        derivation keyword,
        desired key length,
        [AES-ciph-B(rand-32)]: output from CSNDPKE,
            random 32 byte value encrypted by AES-ciph-B
        AES-ciph-B: AES-cipher key CCA token for Bob
        EC-priv-B: Bob's private ECC key
        EC-cert-A: Alice's public key
        output skeleton token
        Optional AES IV encryption
    outputs:
        CCA shared-key token
Alice's call to CSNDEDH
    inputs:
        derivation keyword,
        desired key length,
        [Kyb-pub-A(rand-32)]: output from CSNDPKE,
            random 32 byte value encrypted by Kyb-pub-A
        Kyb-priv-A: CRYSTALS-Kyber private
            key CCA token for Alice
        EC-priv-A: Alice's private ECC key
        EC-cert-B: Bob's public key
        output skeleton token
    outputs:
        CCA shared-key token Concatenation Strings Used for Each Derivation Service
This table describes the concatenation string used for derivation service DERIV01.

TABLE 1

CSNDEDH concatenation strins format for DERIV01

| Offset (bytes) | Length (bytes) | Value | Comments |
|---|---|---|---|
| 0 | 4 | Initialized to X'00000001' | Counter (four-byte) unsigned integer |
| 4 | xx | Z | A shared secret bit string or octet string |
| Fields added when QSA-ECDH is chosen | | | |
| 4 + xx | tt | T plaintext decrypted from the hybrid_ciphertext parameter | plaintext used for the QSA hybrid scheme |
| 4 + xx + tt | 1 | Value X'03' DES X'04' AES | Algorithm Identifier |
| 5 + xx + tt | 1 | Passed party_info_length variable | Party information length passed by caller, converted to a one-byte unsigned integer |
| 6 + xx + tt | party_info_length | String identified by party_info parameter | Party information passed by the caller |
| 6 + xx + tt + party_info_length | 2 | Supplied public information length, zz | Two-byte unsigned integer specifying length of supplied public information |
| 6 + xx + tt + party_info_length | 2 | Supplied public information length, zz | Two-byte unsigned integer specifying length of supplied public information |
| 8 + xx + tt + party_info_length | zz | Supplied public information | Token data extracted from the skeleton key token identified by the output_key_identifier parameter |

Note:
All integers are in Big-Endian format.

This table describes the concatenation string used for derivation service DERIV02.

TABLE 2

CSNDEDH concatenation string format for DERIV02

| Offset (bytes) | Length (bytes) | Value | Comments |
|---|---|---|---|
| 0 | xx | Z | A shared secret bit string or octet string |
| Fields added when QSA-ECDH is chosen | | | |
| xx | tt | T plaintext decrypted from the hybrid_ciphertext parameter | 32 byte plaintext decrypted from the hybrid_ciphertext parameter; length not an explicit field in concatenation string |
| xx | 4 | Initialized to X'00000001' | Counter (four-byte) unsigned integer |
| 4 + xx | yy | String identified by party_info parameter | Party information passed by the caller; length not an explicit field in concatenation string |

Note:
All integers are in Big-Endian format.

Figure 4:
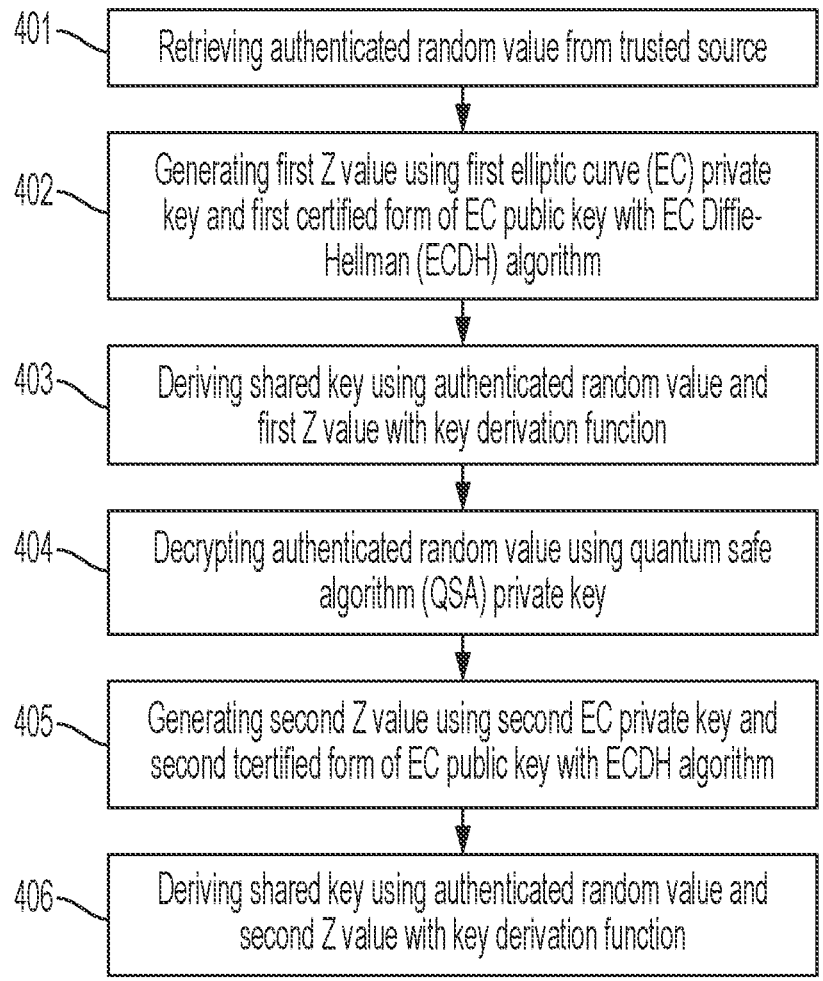
FIG. 4 is a flow diagram illustrating a method of executing a hybrid quantum safe key exchange system in accordance with embodiments of the present invention.

With reference to FIG. 4, a computer-implemented method of executing a hybrid quantum safe key exchange system is provided in accordance with one or more embodiments of the present invention. As shown in FIG. 4, the computer-implemented method includes retrieving an authenticated random value from a trusted source (401), generating a first Z value using a first elliptic curve (EC) private key and a first certified form of an EC public key with an EC Diffie-Hellman (ECDH) algorithm (402) and deriving a (hybrid) shared key using the authenticated random value and the first Z value with a key derivation function (403). The computer-implemented method further includes decrypting the authenticated random value using a quantum safe algorithm (QSA) private key (404), generating a second Z value using a second EC private key and a second certified form of the EC public key with the ECDH algorithm (405) and deriving the (hybrid) shared key using the authenticated random value and the second Z value with the key derivation function (406).

In accordance with embodiments, the initially decrypting of the random value, the retrieving of the authenticated random value from the trusted source, the generating of the first Z value and the deriving of the shared key using the authenticated random value and the first Z value are executed at a second computer and the decrypting of the authenticated random value, the generating of the second Z value and the deriving of the shared key using the authenticated random value and the second Z value are executed at a first computer.

Also, the computer-implemented method includes encrypting the authenticated random value using a cipher key and a QSA public key at the second computer. The encrypting includes a call of a first common cryptographic architecture (CCA) programming interface and each instance of the deriving of the shared key includes a call of a second CCA programming interface. Prior to the decrypting of the authenticated random value, the authenticated random value is wrapped with the QSA public key.

Figure 5:
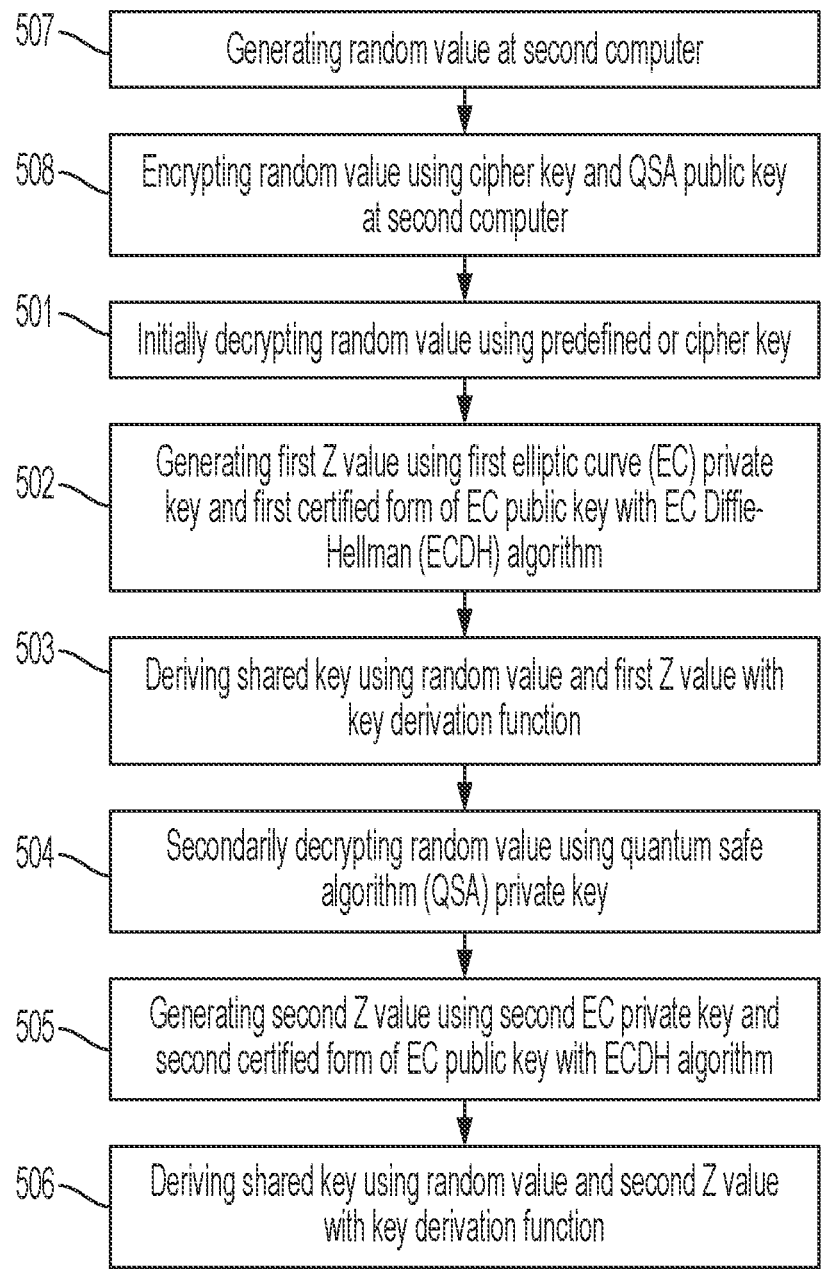
FIG. 5 is a flow diagram illustrating a method of executing a hybrid quantum safe key exchange system in accordance with embodiments of the present invention.

In accordance with one or more embodiments of the present invention, the key derivation function includes a hashing of at least the random value and the first Z value at the second computer and a hashing of at least the random value and the first Z value at the first computer. Alternatively, in accordance with one or more embodiments of the present invention, the key derivation function includes a hashing of at least the random value concatenated with the first Z value at the second computer and a hashing of at least the random value concatenated with the second Z value at the first computer With reference to FIG. 5, a computer-implemented method of executing a hybrid quantum safe key exchange system is provided in accordance with one or more embodiments of the present invention. As shown in FIG. 5, the computer-implemented method includes initially decrypting a random value using a predefined or cipher key (501), generating a first Z value using a first elliptic curve (EC) private key and a first certified form of an EC public key with an EC Diffie-Hellman (ECDH) algorithm (502) and deriving a (hybrid) shared key using the random value and the first Z value with a key derivation function (503). In addition, the computer-implemented method further includes secondarily decrypting the random value using a quantum safe algorithm (QSA) private key (504), generating a second Z value using a second EC private key and a second certified form of the EC public key with the ECDH algorithm (505) and deriving the (hybrid) shared key using the random value and the second Z value with the key derivation function (506).

In accordance with embodiments, the initially decrypting of the random value, the generating of the first Z value and the deriving of the shared key using the random value and the first Z value are executed at a second computer and the secondarily decrypting of the random value, the generating of the second Z value and the deriving of the shared key using the random value and the second Z value are executed at a first computer.

Also, prior to the initially decrypting of the random value, the computer-implemented method includes generating the random value at the second computer (507) and encrypting the random value using the cipher key and a QSA public key at the second computer (508). In these or other cases, the generating and the encrypting of the random value include a call of a first common cryptographic architecture (CCA) programming interface, the initially decrypting of the random value, the generating of the first Z value and the deriving of the shared key include a call of a second CCA programming interface and the secondarily decrypting of the random value, the generating of the second Z value and the deriving of the shared key include a call of the second CCA programming interface. Prior to the secondarily decrypting of the random value, the random value is wrapped with the QSA public key.

In accordance with one or more embodiments of the present invention, the key derivation function includes a hashing of at least the random value and the first Z value at the second computer and a hashing of at least the random value and the second Z value at the first computer. Alternatively, in accordance with one or more embodiments of the present invention, the key derivation function includes a hashing of at least the random value concatenated with the first Z value at the second computer and a hashing of at least the random value concatenated with the second Z value at the first computer.

Figure 6:
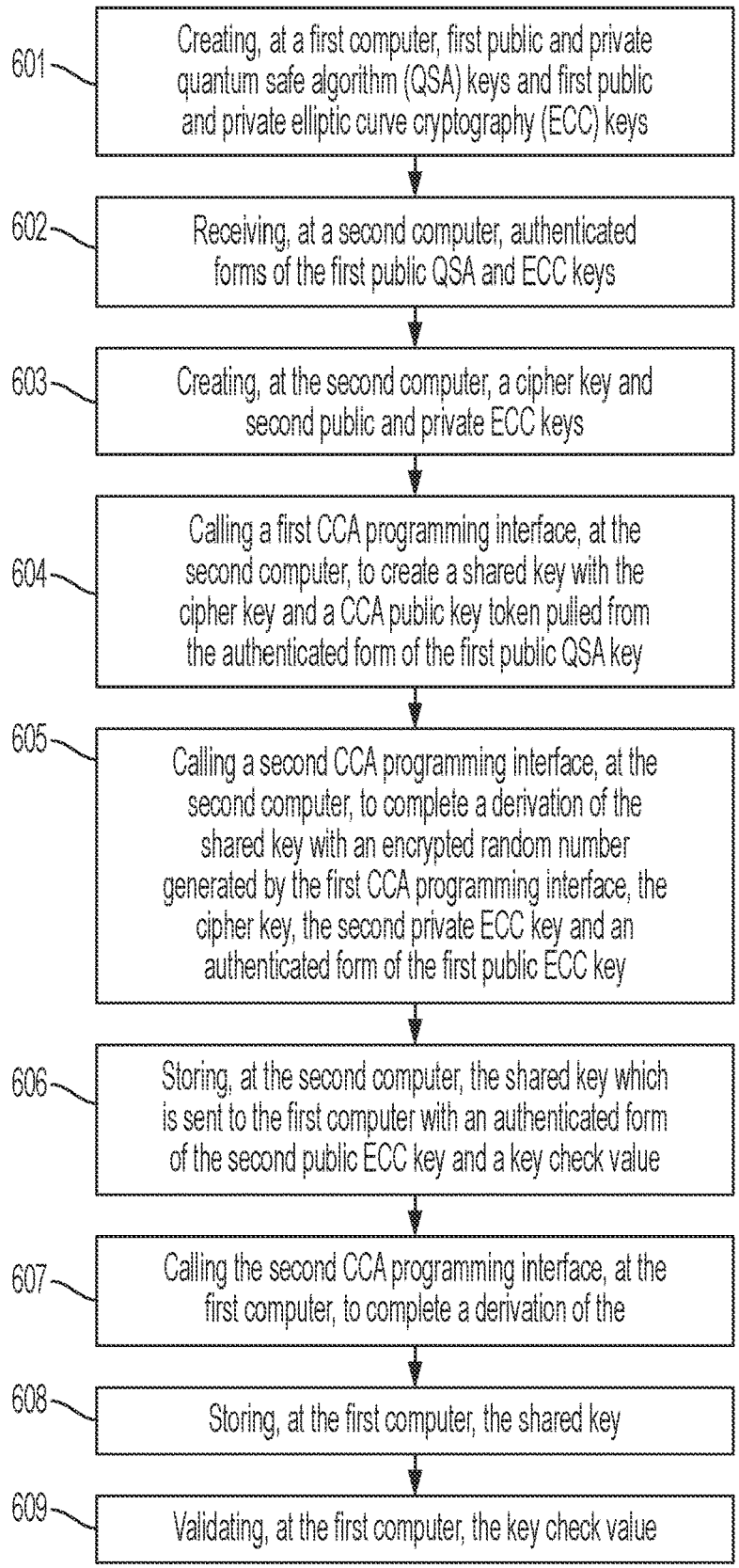
FIG. 6 is a flow diagram illustrating a method of executing a hybrid quantum safe key exchange system using CCA programming interfaces in accordance with embodiments of the present invention.

With reference to FIG. 6, a computer-implemented method of executing a hybrid quantum safe key exchange system using common cryptographic architecture (CCA) programming interfaces is provided in accordance with one or more embodiments of the present invention. As shown in FIG. 6, the computer-implemented method includes creating, at a first computer, first public and private quantum safe algorithm (QSA) keys and first public and private elliptic curve cryptography (ECC) keys (601), receiving, at a second computer, authenticated forms of the first public QSA and ECC keys (602) and creating, at the second computer, a cipher key and second public and private ECC keys (603). The computer-implemented method further includes calling a first CCA programming interface, at the second computer, to create a shared key with the cipher key and a CCA public key token pulled from the authenticated form of the first public QSA key (604), calling a second CCA programming interface, at the second computer, to complete a derivation of the shared key with an encrypted random number generated by the first CCA programming interface, the cipher key, the second private ECC key and an authenticated form of the first public ECC key (605) and storing, at the second computer, the shared key which is sent to the first computer with an authenticated form of the second public ECC key and a key check value (606). In addition, the computer implemented method also includes calling the second CCA programming interface, at the first computer, to complete a derivation of the shared key with the shared key, the first private QSA key, the first private ECC key and an authenticated form of the second public ECC key (607), storing, at the first computer, the shared key (608) and validating, at the first computer, the key check value (609).

Figure 7:
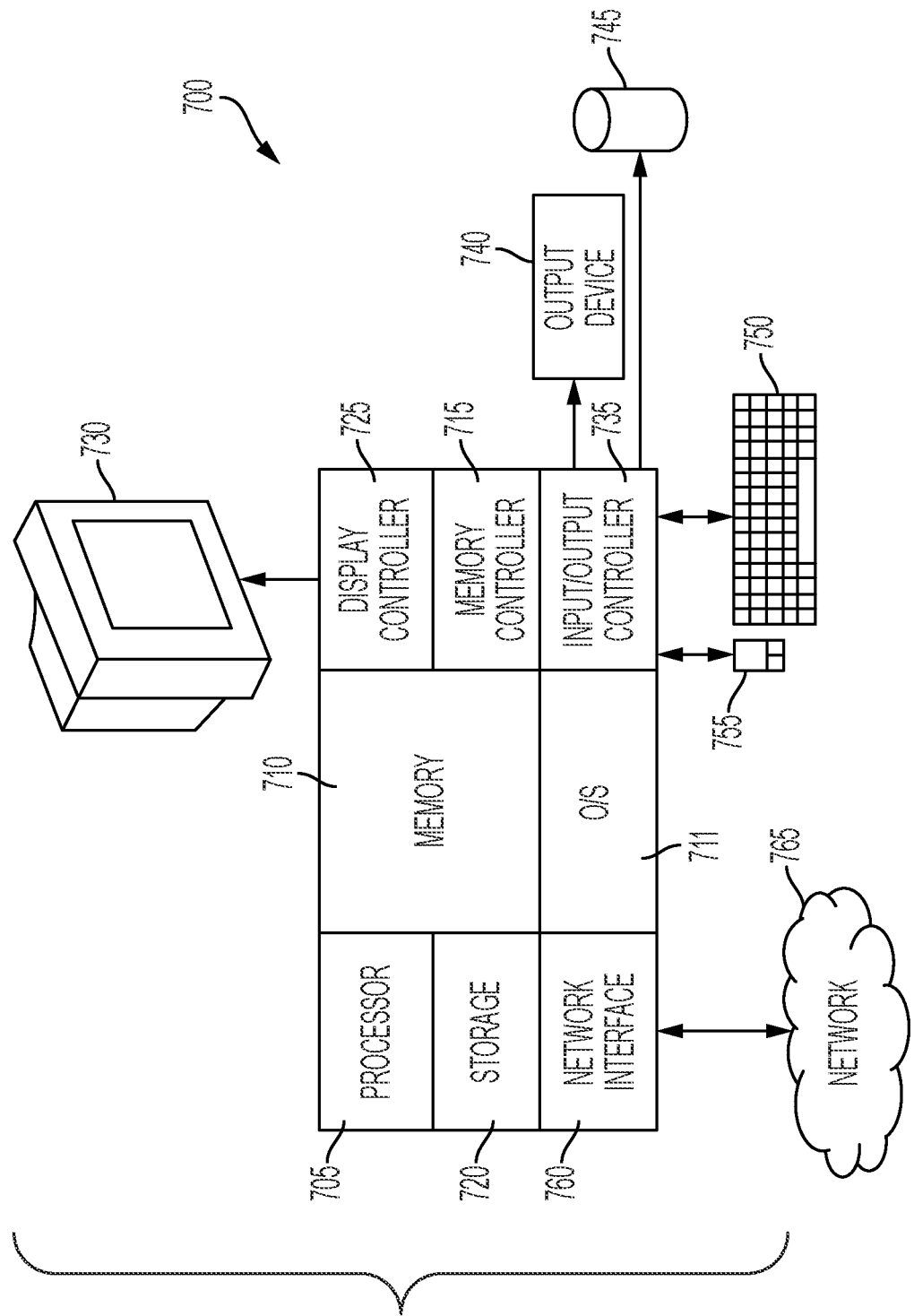
FIG. 7 depicts a computer system for executing in accordance with one or more embodiments of the present invention.

Turning now to FIG. 7, a computer system 700 for enhanced key wrapping. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 700 therefore may include general-purpose computer or mainframe capable of running multiple instances of an O/S simultaneously.

In an exemplary embodiment, in terms of hardware architecture, as shown in FIG. 7, the computer includes one or more processors 705, memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 735 may include a plurality of sub-channels configured to access the output devices 740 and 745. The sub-channels may include fiber-optic communications ports.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 form a suitable operating system (OS) 711. The operating system 711 essentially controls the execution of other computer programs and provides scheduling, input-output control, file and data management, memory management, and communication control and related services.

The memory 710 may include multiple logical partitions (LPARs), each running an instance of an operating system. The LPARs may be managed by a hypervisor, which may be a program stored in memory 710 and executed by the processor 705.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer and any external server, client and the like via a broadband connection. The network 765 transmits and receives data between the computer and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer is activated.

When the computer is in operation, the processor 705 is configured to execute instructions stored within the memory 710, to communicate data to and from the memory 710, and to generally control operations of the computer pursuant to the instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of executing a hybrid quantum safe key exchange system, the computer-implemented method comprising:
   generating a quantum safe algorithm (QSA) key pair for key encryption management and first and second elliptic curve cryptography (ECC) key pairs for key agreement;
   generating a random value;
   generating a first Z value using a private key of the first ECC key pair and a certified form of a public key of the second ECC key pair with an EC Diffie-Hellman (ECDH) algorithm;

deriving a shared key using the random value and the first Z value with a key derivation function;

encrypting the random value using a public key of the QSA key pair to produce an encrypted random value;

decrypting the encrypted random value using a private key of the QSA key pair to produce the random value;

generating a second Z value using a private key of the second ECC key pair and a certified form of a public key of the first ECC key pair with the ECDH algorithm; and deriving the shared key using the random value produced by the decrypting and the second Z value with the key derivation function.

2. The computer-implemented method according to claim 1, wherein the generating of the random value at the trusted source, the generating of the first Z value using the private key of the first ECC key pair and the certified form of the public key of the second ECC key pair with an EC Diffie-Hellman (ECDH) algorithm, the deriving of the shared key using the random value and the first Z value with the key derivation function and the encrypting of the random value using the public key of the QSA key pair to produce the encrypted random value are executed separately from the decrypting of the encrypted random value using the private key of the QSA key pair to produce the random value, the generating of the second Z value using the private key of the second ECC key pair and the certified form of the public key of the first key pair with the ECDH algorithm and the deriving of the shared key using the random value produced by the decrypting and the second Z value with the key derivation function are executed at a second computer.

3. The computer-implemented method according to claim 1, wherein:
the encrypting of the random value comprises a call of a first cryptographic architecture (CA) programming interface, and
each instance of the deriving of the shared key comprises a call of a second CA programming interface.

4. The computer-implemented method according to claim 1, wherein the key derivation function comprises hashing.

5. A computer program product for executing a hybrid quantum safe key exchange system, the computer program product comprising:
a computer-readable medium having program instructions embodied therewith, the program instructions being readable by a processing system to cause the processing system to execute a method comprising:

generating a quantum safe algorithm (QSA) key pair for key encryption management and first and second elliptic curve cryptography (ECC) key pairs for key agreement;

generating a random value;

generating a first Z value using a private key of the first ECC key pair and a certified form of a public key of the second ECC key pair with an EC Diffie-Hellman (ECDH) algorithm;

deriving a shared key using the random value and the first Z value with a key derivation function;

encrypting the random value using a public key of the QSA key pair to produce an encrypted random value;

decrypting the encrypted random value using a private key of the QSA key pair to produce the random value;

generating a second Z value using a private key of the second ECC key pair and a certified form of a public key of the first ECC key pair with the ECDH algorithm; and deriving the shared key using the random value produced by the decrypting and the second Z value with the key derivation function.

6. The computer program product according to claim 5, wherein the generating of the random value at the trusted source, the generating of the first Z value using the private key of the first ECC key pair and the certified form of the public key of the second ECC key pair with an EC Diffie-Hellman (ECDH) algorithm, the deriving of the shared key using the random value and the first Z value with the key derivation function and the encrypting of the random value using the public key of the QSA key pair to produce the encrypted random value are executed separately from the decrypting of the encrypted random value using the private key of the QSA key pair to produce the random value, the generating of the second Z value using the private key of the second ECC key pair and the certified form of the public key of the first key pair with the ECDH algorithm and the deriving of the shared key using the random value produced by the decrypting and the second Z value with the key derivation function are executed at a second computer.

7. The computer program product according to claim 6, wherein:
the encrypting of the random value comprises a call of a first cryptographic architecture (CA) programming interface, and
each instance of the deriving of the shared key comprises a call of a second CA programming interface.

8. The computer program product according to claim 6, wherein the key derivation function comprises hashing.

* * * * *